UNITED STATES PATENT OFFICE.

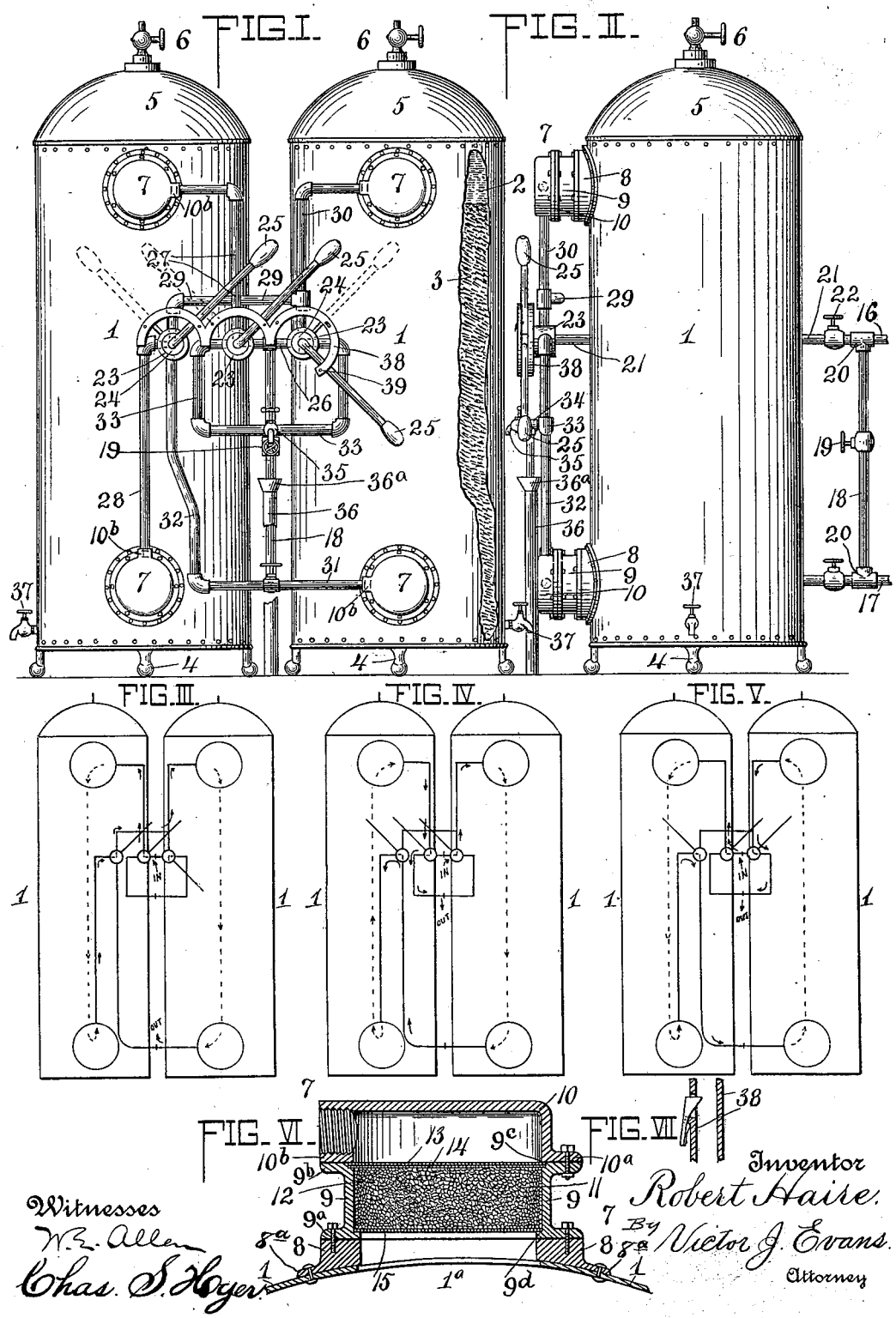

ROBERT HAIRE, OF NEWPORT, RHODE ISLAND.

FILTER.

SPECIFICATION forming part of Letters Patent No. 631,301, dated August 22, 1899.

Application filed April 14, 1899. Serial No. 713,015. (No model.)

*To all whom it may concern:*

Be it known that I, ROBERT HAIRE, a citizen of the United States, residing at the city of Newport, in the county of Newport and State of Rhode Island, have invented certain new and useful Improvements in Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is an improvement on those filters which are located between a supply-pipe connected with the water-main and a service-pipe connected with the distributing-pipes of a building.

My improved filter comprises right-hand and left-hand vertically-arranged cylinders, providing two chambers adapted to contain filtering material, such as pulverized or granulated animal charcoal, each cylinder having upper and lower horizontally-arranged strainer-boxes, providing four chambers adapted to contain filtering material—such as pebbles—right-hand, left-hand, and intermediate three-way valves, each having a two-way turn-plug, and pipe-sections connected with the valves and connecting the valves with the strainer-boxes, as hereinafter described and claimed.

In order that my invention may be fully understood, I will proceed to describe it with reference to the accompanying drawings, in which—

Figure 1 is a front elevation of my improved filter, the right-hand cylinder being broken away to exhibit the filtering material therein, the position of the valve-levers during the filtering operation being shown in full lines and the position of the valve-levers during the steaming operation being shown by broken lines. Fig. 2 is an elevation of the filter, looking from the right-hand side. Fig. 3 is a diagrammatic front view of the filter, showing the position of the valve-levers during the filtering operation, the direction in which the water flows through the pipes and the cylinders when the valve-levers are thus arranged being indicated by arrows and broken lines, respectively. Fig. 4 is a similar view showing the position of the valve-levers when washing out the left-hand cylinder, the direction in which the water flows through the pipes and the cylinders when the valve-levers are thus arranged being indicated by arrows and broken lines, respectively. Fig. 5 is a similar view showing the position of the valve-levers when washing out the right-hand cylinder. Fig. 6 is an enlarged detail axial section of one of the cylindrical strainer-boxes. Fig. 7 is a detail section of a lever-segment, showing a pivoted spring catch or stop for the right-hand valve-lever.

My filter comprises a pair of vertically-arranged right-hand and left-hand cylinders 1, preferably constructed of galvanized boiler-iron, providing two chambers 2 for containing pulverized or granulated animal charcoal, which form two filtering-beds 3, each about four (4) feet in height, approximately, so that with the combined beds the water to be filtered passes through eight (8) feet, approximately, of filtering material. The cylinders 1 are supported upon suitable stands 4 and are provided at the top with bonnets or domes 5, having air-vents 6. At the upper and lower parts of the faces of the cylinders are located strainer-boxes 7.

8 are rings each having a flange $8^a$ securely riveted or bolted to the cylinder around a circular opening $1^a$ in the latter. The strainer-boxes are each constructed with an annular body 9, having an inner flange $9^a$, screwed to a ring, so as to be removable, an outer flange $9^b$, and with a cap or cover 10, having a flange $10^a$, attached to the outer flange $9^b$ of the body by bolts or rivets, and a screw-threaded pipe-socket $10^b$. The annular body 9 provides a chamber 11 for containing pebbles 12. The strainer-boxes are made of galvanized-iron castings. Between the cap or cover and the pebble-chamber and seated in an inner annular recess $9^c$ of the annular body is an outer strainer-plate 13, having a coarse mesh, and an intermediate strainer-plate 14, having a fine mesh. An inner strainer-plate 15, having a superfine mesh, is seated against an annular shoulder $9^d$ at the inner part of the annular body. These strainer-plates are made of tinned brass about one-eighth ($\frac{1}{8}$) of an inch thick, and the pebbles provide a filling between the inner and the intermediate strainer-plates. The flow of water to, through, and from the filter is controlled by means which I will now describe.

16 is an upper water-supply pipe connected with the water-main, and 17 is a lower service-pipe connected with the distributing-pipes of the building.

18 is a by-pass having a controlling-valve 19.

20 are three-way or T couplings whereby the supply and service pipes are connected to the by-pass. From the upper coupling 20 and extending forward between the cylinders is a pipe 21, having a controlling-valve 22.

23 are right-hand intermediate and left-hand three-way valves each provided with a two-way turn-plug 24, having a lever 25. The pipe 21 is connected with the right-hand and intermediate valves by means of a pipe-section 26.

27 is a pipe-section connecting the intermediate valve with the pipe-socket $10^b$ of the upper strainer-box of the left-hand cylinder. Extending upwardly from the socket $10^b$ of the lower strainer-box of the left-hand cylinder is a pipe-section 28, connected with the left-hand valve, which is connected by a laterally-extending pipe-section 29 with a pipe-section 30, connecting the right-hand valve with the pipe-socket $10^b$ of the upper strainer-box of the right-hand cylinder.

31 is a horizontal pipe-section connected with the pipe-socket of the lower strainer-box of the right-hand cylinder with which the lower service-pipe 17 is connected.

32 is a pipe-section connecting the horizontal pipe-section 31 with the left-hand valve.

33 is a pipe-loop connecting the right-hand and intermediate valves, provided with a waste or sewer-pipe section 34, having a draw-off faucet 35 and discharging into the funnel $36^a$ of a waste or sewer pipe 36.

37 are draw-off faucets from the cylinder-chambers.

38 are double lever-segments across which pins 39 extend to limit the play of the levers. The right-hand segment has an extension to permit additional play of the right-hand lever. This segment is provided with a spring stop or catch for controlling the movement of this lever.

My improved filter is operated in the following manner: For filtering through both cylinders the valve-levers are arranged as shown in Figs. 1, 2, and 3 and the by-pass valve is closed. The supply and service valves are opened. The water will now flow, as indicated by the arrows and broken lines in Fig. 3, through the intermediate valve to the upper strainer-box of the left-hand cylinder, down through the left-hand cylinder, out through the lower strainer-box of the left-hand cylinder, through the left-hand valve to the upper strainer-box of the right-hand cylinder, down through the right-hand cylinder, and out through the lower strainer-box of the right-hand cylinder to the service-pipe. For washing out the left-hand cylinder the valve-levers are arranged as shown in Fig. 4 and the by-pass valve is closed. The supply and waste or sewer valves are opened. The water will now flow, as indicated by the arrows and broken lines, through the right-hand valve to the upper strainer-box of the right-hand cylinder, down through the right-hand cylinder, out through the lower strainer-box of the right-hand cylinder, through the left-hand valve to the lower strainer-box of the left-hand cylinder, up through the left-hand cylinder, out through the upper strainer-box of the left-hand cylinder, through the intermediate valve, and out through the waste or sewer valve. For washing out the right-hand cylinder the valve-levers are arranged as shown in Fig. 5 and the by-pass valve is closed. The water will now flow, as indicated by the arrows and broken lines, through the intermediate valve to the upper strainer-box of the left-hand cylinder, down through the left-hand cylinder, out through the lower strainer-box of the left-hand cylinder, through the left-hand valve to the lower strainer-box of the right-hand cylinder, up through the right-hand cylinder, out through the strainer-box of the right-hand cylinder, through the right-hand valve, and out through the waste or sewer valve. For cleaning out the filter-beds or aerating or repairing the filter the valve-levers are arranged so that the right-hand, intermediate, and left-hand valves are all opened, as shown in broken lines in Fig. 1. The supply-valve and service-valve are closed. The by-pass valve is opened, so that the main is opened direct to the building through the by-pass, and the filter is thus cut off for the time being without stopping the supply of water to the building.

It will be observed that my filter is simply arranged for washing, and as the strainer-boxes and outlet and inlet valves are on the faces of the cylinders they can be readily removed by a plumber, so as to gain access to the chambers through the chamber-openings when it is desired to renew the filtering material and also to clean out the chambers of the strainer-boxes without unbolting or un-riveting the bonnets or dome-tops or lifting off the cylinders from their stands, as the cylinders weigh from two hundred to three hundred pounds. As the water is passed through about eight (8) feet of filtering material, it is doubly filtered, as the water passes first through one cylinder and then through the other cylinder. With my construction of filter it is not necessary to shut the water off from the building when cleansing it, as one chamber cleanses the other filter, so that any water which is drawn is filtered water, as no unfiltered water contaminates the filter-bed. The cylinders can be emptied out dry by shutting off the two valves at the back of the filter on the supply and service pipe sections and opening the by-pass valve, which action shuts off the water from the filters and opens the supply-pipe from the main direct to the service-pipe leading to the distributing-pipes of the building.

Having thus described my invention, the following is what I claim as new therein and desire to secure by Letters Patent:

1. A filter comprising right-hand and left-hand cylinders, providing chambers for containing filtering material, each cylinder having upper and lower openings, strainer-boxes secured to the cylinders in front of their openings, right-hand, left-hand, and intermediate three-way valves, each valve having a two-way turn-plug, a cross pipe-section connecting the intermediate and right-hand valves, a pipe-section connecting the supply-pipe with the cross pipe-section, a pipe-section connecting the intermediate valve with the upper strainer-box of the left-hand cylinder, a pipe-section connecting the lower strainer-box of the left-hand cylinder with the left-hand valve, pipe-sections connecting the left-hand valve with the upper strainer-box of the right-hand cylinder, and pipe-sections connecting the lower strainer-box of the right-hand cylinder with the service-pipe, and with the left-hand valve, substantially as described.

2. A filter comprising right-hand and left-hand cylinders providing chambers for containing filtering material, each cylinder having upper and lower openings, strainer-boxes secured to the cylinder in front of their openings, right-hand, left-hand, and intermediate three-way valves, each valve having a two-way turn-plug, a cross pipe-section connecting the intermediate and right-hand valves, a pipe-section connecting the supply-pipe with the cross pipe-section, a pipe-section connecting the intermediate valve with the upper strainer-box of the left-hand cylinder, a pipe-section connecting the lower strainer-box of the left-hand cylinder with the left-hand valve, pipe-section connecting the left-hand valve with the upper strainer-box of the right-hand cylinder, pipe-sections connecting the lower strainer-box of the right-hand cylinder with the service-pipe and with the left-hand valve, and pipe-sections connecting the intermediate and right-hand valves, substantially as described.

3. A filter comprising right-hand and left-hand cylinders, providing chambers for containing filtering material, each cylinder having upper and lower openings, strainer-boxes secured to the cylinders in front of their openings, right-hand, left-hand, and intermediate three-way valves, each valve having a two-way turn-plug, a cross pipe-section connecting the intermediate and right-hand valves, a pipe-section having a valve and connecting the supply-pipe with the cross pipe-section, a pipe-section connecting the intermediate valve with the upper strainer-box of the left-hand cylinder, a pipe-section connecting the lower strainer-box of the left-hand cylinder with the left-hand valve, pipe-sections connecting the left-hand valve with the upper strainer-box of the right-hand cylinder, pipe-sections having a valve and connecting the lower strainer-box of the right-hand cylinder with the service-pipe and with the left-hand valve and the by-pass having a valve and connecting the pipe-sections connected with the supply and service pipes, substantially as described.

4. A filter comprising a cylinder, providing a chamber for containing filtering material, having an opening, a strainer-box having a pebble-chamber, an inner strainer-plate having a superfine mesh, an intermediate strainer-plate, having a fine mesh, and an outer strainer-plate having a coarse mesh, a pipe-section connecting with the strainer-box, and a support for the strainer-box attached to and communicating with the cylinder, substantially as described.

In testimony whereof I affix my signature in presence of two witnesses.

ROBERT HAIRE.

Witnesses:
SADIE LEE,
JOSEPH HAIRE.